US008687013B2

(12) United States Patent
Lee et al.

(10) Patent No.: US 8,687,013 B2
(45) Date of Patent: Apr. 1, 2014

(54) METHOD, APPARATUS AND SYSTEM FOR PROVIDING A COLOR DEVICE CHARACTERIZATION WITH A QUALITY EVALUATION

(75) Inventors: Bongsun Lee, La Crescenta, CA (US); Jurgen Stauder, Montreuil sur Ille (FR); Laurent Blonde, Thorigne-Fouillard (FR)

(73) Assignee: Thomson Licensing, Issy les Moulineaux (FR)

( * ) Notice: Subject to any disclaimer, the term of this patent is extended or adjusted under 35 U.S.C. 154(b) by 317 days.

(21) Appl. No.: 13/138,324

(22) PCT Filed: Apr. 1, 2009

(86) PCT No.: PCT/US2009/002041
§ 371 (c)(1),
(2), (4) Date: Aug. 2, 2011

(87) PCT Pub. No.: WO2010/090623
PCT Pub. Date: Aug. 12, 2010

(65) Prior Publication Data
US 2011/0292067 A1  Dec. 1, 2011

(30) Foreign Application Priority Data
Feb. 9, 2009  (EP) .................................. 093051183

(51) Int. Cl.
| G09G 5/00 | (2006.01) |
|---|---|
| G09G 5/02 | (2006.01) |
| G09G 1/28 | (2006.01) |
| H04N 17/00 | (2006.01) |
| H04N 5/52 | (2006.01) |
| H04N 1/46 | (2006.01) |
| G03F 3/08 | (2006.01) |
| G06K 9/00 | (2006.01) |
| G06K 9/40 | (2006.01) |

(52) U.S. Cl.
USPC ........... 345/590; 345/581; 345/600; 345/606; 345/690; 345/22; 348/179; 348/180; 348/679; 382/167; 382/276; 358/504; 358/518; 358/525

(58) Field of Classification Search
USPC ......... 345/581, 589–590, 591, 597, 600, 601, 345/604, 606, 547–549, 204, 690, 694, 22, 345/63, 88; 348/177, 179, 180, 560, 577, 348/630, 679, 728, 739, 791; 358/504, 515, 358/518–520, 523–525; 382/162, 166–167, 382/254, 274, 276
See application file for complete search history.

(56) References Cited

U.S. PATENT DOCUMENTS 6,088,038 A * 7/2000 Edge et al. .................... 345/600
7,075,552 B2   7/2006 Herbert et al.
(Continued)

FOREIGN PATENT DOCUMENTS

EP  1761037  3/2007
JP  07023246  1/1995
(Continued)

*Primary Examiner* — Wesner Sajous
(74) *Attorney, Agent, or Firm* — Robert D. Shedd; Robert B. Levy (57) ABSTRACT

A method, apparatus and system for assessing color characterization quality includes a characterization unit configured for determining at least one of a forward and inverse transform from a first set of device dependent input color values and measured output display values of the first set of device dependent input color values on the display and transforming a second set of device dependent input color values using the determined at least one of a forward and inverse transform to provide an intermediate set of device dependent input color values. The method, apparatus and system further includes a verification unit for performing at least one of a forward transform quality evaluation and an inverse transform quality evaluation.

17 Claims, 5 Drawing Sheets

(56) References Cited

U.S. PATENT DOCUMENTS

| | | |
|---|---|---|
| 7,586,642 B2 | 9/2009 | Chiba |
| 7,595,921 B2 | 9/2009 | Ito et al. |
| 2002/0051131 A1 | 5/2002 | Ohkubo |
| 2003/0193688 A1 | 10/2003 | Namikata |
| 2004/0257599 A1* | 12/2004 | Chi et al. ............ 358/1.9 |
| 2005/0018219 A1 | 1/2005 | Senn et al. |
| 2005/0270600 A1* | 12/2005 | Ito et al. ............ 358/518 |
| 2010/0231728 A1* | 9/2010 | Holub ............ 348/207.2 |
| 2010/0309231 A1* | 12/2010 | Stauder et al. ............ 345/690 |

FOREIGN PATENT DOCUMENTS

| | | |
|---|---|---|
| JP | 200545446 | 2/2005 |
| JP | 2005348052 | 12/2005 |
| JP | 2007510950 | 4/2007 |
| JP | 2008040305 | 2/2008 |
| JP | 2008283375 | 11/2008 |

\* cited by examiner

METHOD, APPARATUS AND SYSTEM FOR PROVIDING A COLOR DEVICE CHARACTERIZATION WITH A QUALITY EVALUATION

CROSS-REFERENCE TO RELATED APPLICATIONS

This application is a National Stage Application and claims the benefit, under 35 U.S.C. §365 of International Application PCT/US2009/002041 filed 1 Apr. 2009, which was published in accordance with PCT Article 21(2) on 12 Aug. 2010 in English, and which claims the benefit of EP patent application No. 09305118.3 filed 9 Feb. 2009.

FIELD OF THE INVENTION

The present invention generally relates to video display calibration and, more particularly, to a method, apparatus and system for assessing color characterization quality of a display device.

BACKGROUND OF THE INVENTION

These days, various types of professional and consumer-level video display devices are available in the market (e.g. LCD, Liquid Crystal on Silicon (LCoS), Plasma, DLP, and CRT). Display devices include all kinds of color reproduction devices, such as film printers, projectors, direct view displays and photo printers. Manufacturers are making an effort to enhance image display qualities in terms of colors, contrast, and gamma, and often claim that their displays show a wider range of colors, higher contrast ratios, and so on. However, those colors, contrast, gammas, etc. often appear quite different on the users' displays (e.g., 'target' displays) as compared to those seen in reference displays which are used to create the video contents during post production. As a result, the end user displays cannot carry on the director's or creator's intended display qualities to the consumer reliably.

In the framework of the calibration of a target display, in order to reproduce colors on the target display close to how they would have been reproduced on a reference display (e.g. a film projector or a CRT), the target display and the reference display have to be characterized, leading to device models. A device model transforms input, device dependent color values into output, device independent color values. A display device can be described by its inverse device model. An inverse device model transforms output, device independent color values into input, devices dependent color values.

One method to ensure good calibration quality is to perform a visual comparison between the reference and the target display with multiple numbers of human subjects. However, this is a very time consuming and extremely costly approach.

Another approach is to calculate objective error measures for the quality of the reference device model and the target device model. However, the quality of an inverse device model is often evaluated in a device dependent color space which does not allow an objective assessment. If quality is evaluated in device independent, absolute color spaces, color transforms with inherent errors are needed so that the resultant quality does not only depend on the device model to be evaluated.

Figure 1:
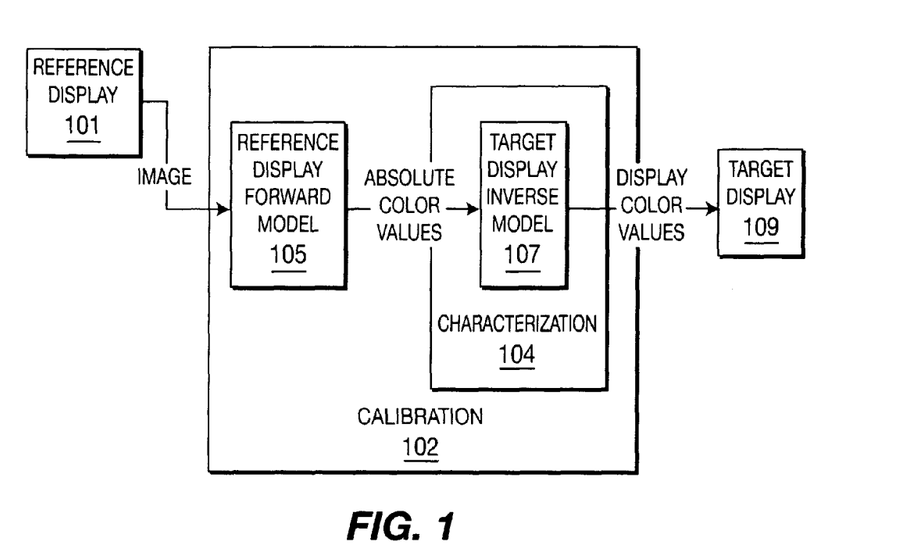
FIG. 1 depicts a general color management workflow for calibrating a target display device.

FIG. 1 depicts a general color management workflow for calibrating a target display device. As shown in FIG. 1, the characterization of a display usually includes color measurement and the building of two display models: the reference display forward model 105, and the target display inverse model 107 from measured colors. Measured colors consist of a first set of device dependent input colors and a first set of corresponding responsive device independent output colors. The display forward model 105 is able to transform device dependent display input colors (e.g., an image from a reference display 101) into device independent display output colors (e.g., absolute color values). The target display inverse model is able to the transform device independent display output colors (absolute color values) into device dependent colors input to a target display 109.

Calibration 102 of a target display is often done by transforming all colors to be displayed first by a forward reference device model 105 and then by an inverse target device model 107.

One approach for quality evaluation is to calculate objective error measures for the forward reference device model and the inverse target device model. To do so, usually second measured colors are used for each display consisting of a second set of device dependent input colors and a second set of corresponding responsive device independent output colors.

For verification of the forward reference model, the second set of device dependent input colors of the reference display device are passed through the forward reference model, resulting in a third set of responsive, device independent output colors. The difference between the second set of device independent output colors and the third set of device independent output colors indicates the quality of the forward reference device model in device independent color space. This quality evaluation is in device independent, absolute color space and therefore sufficient (i.e. errors are correlated with human visual judgment and with radiometric measurement).

For verification of the inverse target model, the second set of device independent output colors of the target device is passed through the inverse target device model resulting in a third set of device dependent input color values. The difference between the third set of device dependent input colors and the second set of device dependent input colors of the target device indicates the quality of the inverse target model in device dependent color space. This quality evaluation is in device dependent color space and therefore not sufficient (i.e. errors are not correlated with the human visual judgment and depend on the target device).

Figure 2:
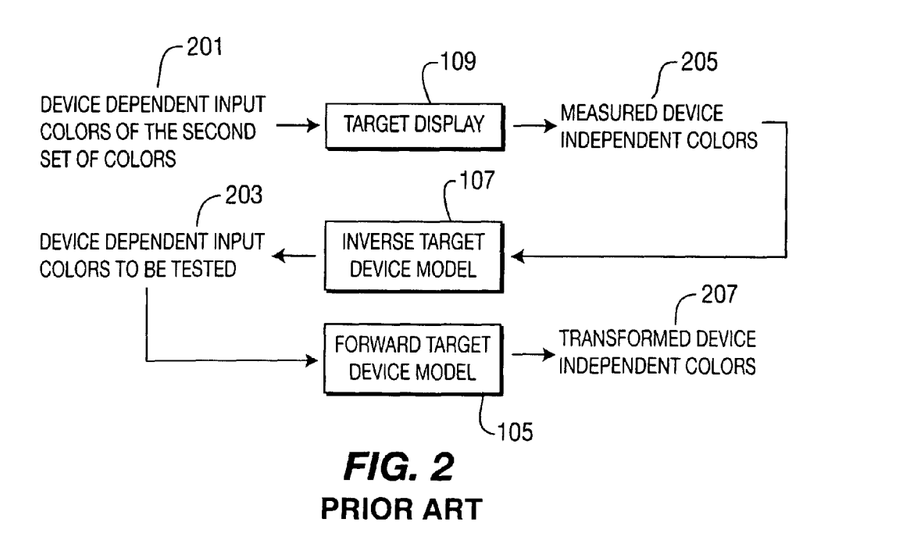
FIG. 2 depicts a first prior art quality evaluation method.

In order to calculate the characterization error of the target device in device independent, absolute color space, one known method applies the following procedure. That is, FIG. 2 depicts a first exemplary quality evaluation method. As shown in FIG. 2, the device dependent input colors to be tested 203 (i.e., the second set of device dependent input colors), are transformed into device independent, absolute colors 207 (i.e., the second set of device independent, output colors). These colors are transformed by the inverse target device model to be tested into device dependent input colors to be tested 203. For color transform into device independent color space, the forward target device model 105 is used. Then, the color differences are evaluated between the transformed device independent colors 207 and the measured device independent colors 205, the second set of device independent output colors 205, indicating the quality of the inverse target device model 107. However, unfortunately, using the forward device model has inherent errors. For example, since the forward device model is calculated from the measured colors of the target display 109, it has certain errors such as measurement errors, characterization modeling errors, etc. Further, the quality indicated by the color differences is the quality of both the inverse and the forward models. This known method fails to evaluate precisely the error of only the inverse target display device model 107.

Figure 3:
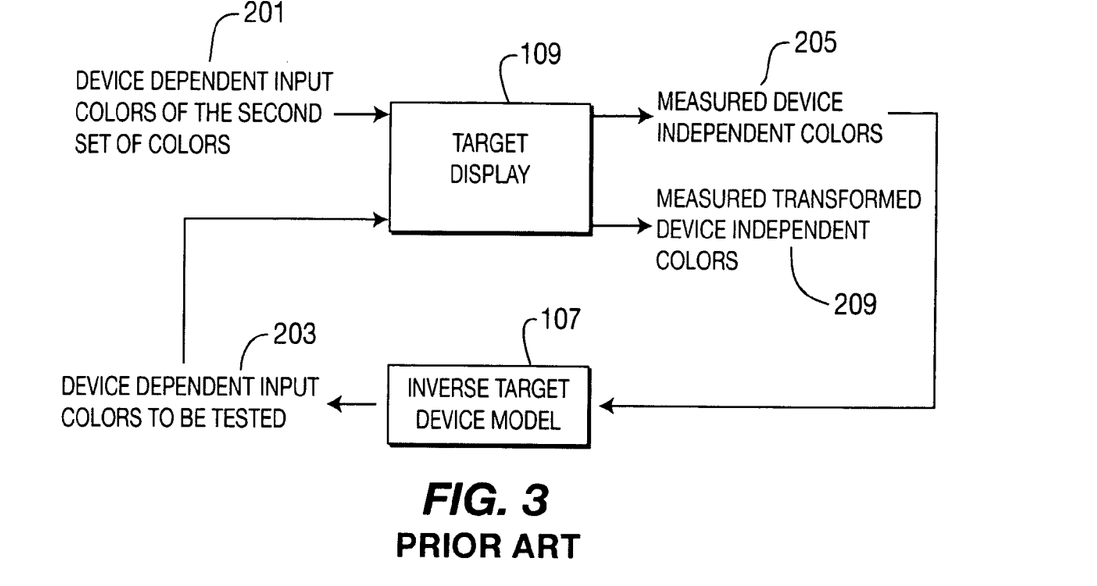
FIG. 3 depicts a second prior art quality evaluation method.

Another exemplary quality evaluation method is depicted in FIG. 3. As shown in FIG. 3, both the device and dependent input colors to be tested 203 and the second set of device dependent input colors of the target display 201 are input into a target display 109. Measuring these colors leads to a first and second set of measured, absolute, device independent colors, respectively. The second set of measured, absolute, device independent colors is input in the inverse target device model 107 to be tested resulting in the mentioned device dependent input colors to be tested 203. Then, the color differences are evaluated between the first and second set of device independent colors (205, 209) indicating the quality of the inverse target device model 107. However, this measurement process has inherent errors from the measurement process of measured transformed device independent colors 205, for example measurement noise. Also, the quality indicated by the color differences is the quality of both the inverse model and the measurement process. This known method also fails to evaluate precisely the error of only the inverse target display device model.

It is to be noted that forward and inverse device models are rarely perfect inverse operators but contain inherent errors, some of which follow:

Out-of-gamut colors: Some of the device independent colors can be outside the color gamut of the device. There are no device-dependent color values for those device independent colors. The inverse device model is not defined for those device independent colors. Usually, those device independent colors need to be mapped into the gamut color gamut of the device. This color mapping causes an error.

Out-of-range colors: Some of the device independent colors can be outside the dynamic range of the device. Their amplitude is either too weak (too dark) or too intense (too luminous). There are no device-dependent color values for those device independent colors. The inverse device model is not defined for those device independent colors. Usually, those device independent colors need to be mapped into the dynamic range of the device. This tone mapping causes an error.

Quantization: Device-dependent color values are quantized in current video systems. Quantization is a lossy operation with no existing inverse operation. For this reason, the inverse device model cannot generally compensate for (or cannot invert) the quantization. Thus, quantization will cause errors in the model. Also, device independent color values are often quantized when calculating on a computer the combination of an inverse and a forward, or of a forward and an inverse model.

Noise: When the device is controlled using device-dependent color values, its electronic and optical circuits will add noise to the signals representing these color values. This effect cannot be inverted and considered in the inverse device model since the noise is stochastic and its instant realization is unknown. Noise will cause reproduction errors.

Model errors: The inverse device model (or any other transform) is usually based on a more or less complicate mathematical model. This model can be simplified or simply not perfect with respect to the inverse device model (or any color reproduction process) that is to be modeled. Furthermore, when building the inverse model from a model (for example for building the inverse device model from a forward model or the forward model from an inverse model), the inverse model combined with the model often not give a neutral operation for reasons of simplicity, numerical precision or linearity of one or both models. This causes model errors.

SUMMARY OF THE INVENTION

Embodiments of the present principles address the deficiencies of the prior art by providing a method, apparatus and system for providing color device characterization and a quality evaluation of same.

In one embodiment of the present invention, a method for assessing color characterization quality of a display device includes determining at least one of a forward and inverse transform from a first set of device dependent input color values and measured output display values of the first set of device dependent input color values on the display, transforming a second set of device dependent input color values using the determined at least one of a forward and inverse transform to provide an intermediate set of device dependent input color values, and performing at least one of a forward transform quality evaluation and an inverse transform quality evaluation. In one embodiment of the above described invention, a forward transform quality evaluation includes transforming the second set of device dependent input color values using the determined at least one of a forward and inverse transform into an intermediate set of device independent output color values, and comparing the intermediate set of device independent output color values with measured output display values of the intermediate set of device dependent input color values on the display to determine a quality measure.

The method of the present invention can further include, generating the first set of device dependent input color values and the second set of device dependent input color values and measuring output display values of the first set of device dependent input color values and the intermediate set of device dependent input color values on the display device.

In an alternate embodiment of the present invention, an apparatus for assessing color characterization quality of a display device includes a characterization unit configured to determe at least one of a forward and inverse transform from a first set of device dependent input color values and measured output display values of the first set of device dependent input color values on the display and to transform a second set of device dependent input color values using the determined at least one of a forward and inverse transform to provide an intermediate set of device dependent input color values. In such an embodiment, the apparatus can further include a verification unit for performing at least one of a forward transform quality evaluation and an inverse transform quality evaluation using at least the second set of device dependent input color values.

The apparatus of the present invention can further include a color set generator and transformation module for generating at least one of the first set of device dependent input color values and the second set of device dependent input color values and a measurement unit for measuring at least one of output display values of the first set of device dependent input color values displayed on the display device and output display values of the intermediate set of device dependent input color values displayed on the display device.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

A method, apparatus and system for performing a color characterization of a display device and a quality evaluation of the characterization of the display device is advantageously provided according to various aspects of the present principles. Although the present invention will be described primarily within the context of a specific color display system and method, the specific embodiments of the present principles should not be treated as limiting the scope of the invention. It will be appreciated by those skilled in the art and informed by the teachings of the present principles that the concepts of the present principles can be advantageously applied in other environments in which display calibration and quality verification is desired.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown. It should be noted that the terms 'color(s)' and 'color value(s)' are used interchangeably throughout the description herein and should be intended to describe color(s) and associated color value(s) depending on the situation in which the terms are used.

As described above, FIG. 1 depicts a general color management workflow for calibrating a target display device. The color management workflow shown in FIG. 1 involves two different transforms: the reference display forward transform/model 105 and the target display inverse transform/model 107. The forward transform maps device dependent values (e.g. RGB) to device independent values (e.g. CIE, XYZ). The forward transform is defined from a forward model characterization process and needs to be known only for the reference display. The inverse transform is used to map absolute, device independent values to device dependent values. This transform is defined from an inverse model characterization process and needs to be known only for the target display.

An image signal arrived in a reference display 101 is fed into a reference display forward model 105 that outputs absolute, display independent color values. For example, these can comprise CIE, XYZ tri-stimulus values. The CIE color model was developed to be completely independent of any device or other means of emission or reproduction and is based as closely as possible on how humans perceive color.

The target display inverse model 107 generates device dependent display color values to be shown on the target display 109 in such a way that the target display produces colors corresponding as best as possible to the absolute, device independent color values. This procedure ensures that the image is reproduced on the target display as close as possible to the way that the reference display would have reproduced the image in terms of color reproduction. The reproduced look can address various color reproduction characteristics such as brightness, contrast, saturation, hue, and tones, but in general, this can include any characteristic of color perception. This kind of calibration is called colorimetric color reproduction and the framework is called a color management framework.

In addition, other methods can be used to calibrate displays. For example, the image signal can be passed through direct transforms such as a Look-Up Table (LUT) or parametric functions or a combination of both in order to generate display color values aimed to the target display.

In accordance with various embodiments of the principles of the present invention, after a calibration, as described above, is completed, its performance or quality should be evaluated to verify that the given color management workflow is performed correctly and with limited error. For example, in one embodiment of the present invention, a novel objective quality measure is provided to evaluate/verify the characterization quality of display devices, which can be applied to the characterization of any display device, whether a target display or reference display. In various embodiments of the present invention, a system and method for assessing color characterization quality of a first set of device dependent input color values of a display device applies to both, forward characterization and inverse characterization processes of a display. The errors calculated from the quality measure represent how the human visual system would perceive the differences between the reference display and the target display. Therefore, such a system and method enable the effectiveness of an implemented color management workflow to be accurately assessed without requiring the involvement of human subjects.

A system and method according to various embodiments of the present possess at least the following advantages:
1. The error of the forward characterization model can be calculated independent from the errors of the inverse characterization model;
2. The error of the inverse characterization model can be calculated independent from the errors of the forward characterization model;
3. The error can be calculated in device dependent and device independent color space without additional error influence.

That is, a system and method according to various embodiments of the present principles advantageously provide a novel objective quality measure to evaluate and verify the characterization quality of display models in device independent, absolute color spaces without the influence of errors of other color transforms. A system and method is provided that provides a color device characterization with a quality evaluation or verification in both forward and inverse characterization workflows.

Figure 4:
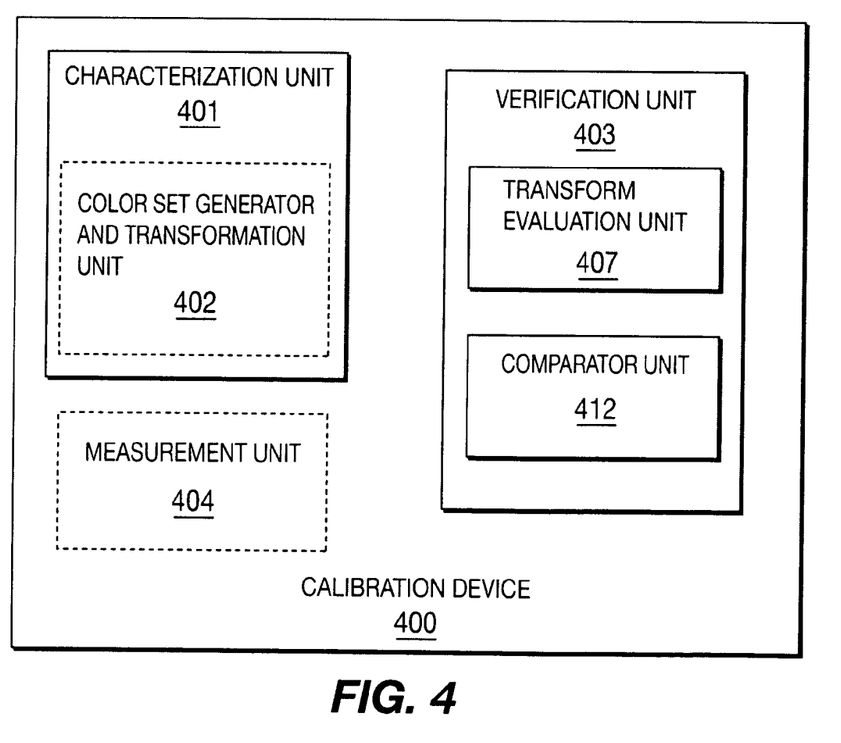
FIG. 4 depicts a high level block diagram of a calibration device in accordance with an embodiment of the present invention.

FIG. 4 depicts a high level block diagram of a calibration device 400 in accordance with an embodiment of the present invention. The calibration device 400 of FIG. 4 illustratively includes a characterization unit 401, a verification unit 403 and an optional measurement unit 404. In the illustrated embodiment of the characterization unit 401 of the calibration device 400 of FIG. 4, the characterization unit 401 illustratively includes an optional color set generator and transformation unit 402. In such an embodiment, the characterization unit 401 is capable of generating at least a first set of device dependent input color values and a second set of device dependent input color values using the color set generator and transformation unit 402. Although in FIG. 4, the color set generator and transformation unit 402 is illustratively depicted as an integrated component of the characterization unit 401, in alternate embodiment of the present invention, the color set generator and transformation unit 402 can comprise a separate component of the calibration device 400. In addition, although the embodiment of the calibration device 400 of FIG. 4 illustratively comprises a first color set generator and transformation unit 402 for generating at least a first set of device dependent input color values and a second set of device dependent input color values, in alternate embodiments of the present invention, information regarding a first set of device dependent input color values and a second set of device dependent input color values can be communicated to a calibration device of the present invention for performing the novel techniques described herein and, as such, a calibration device in accordance with an alternate embodiment of the present invention does not need to include a first color set generator and transformation unit 402.

In the illustrated embodiment of the calibration device 400 of FIG. 4, the optional measurement unit 404 can include a color meter, photometer or other measurement device for measuring output display values of device dependent input color values presented on a display device. Again, although the embodiment of the calibration device 400 of FIG. 4 illustratively comprises a measurement unit 404 for measuring output display values of device dependent input color values presented on a display device, in alternate embodiments of the present invention, information regarding output display values of device dependent input color values presented on a display device can be communicated to a calibration device of the present invention for performing the novel techniques described herein and, as such, a calibration device in accordance with an alternate embodiment of the present invention does not need to include a measurement unit 404.

In the calibration device 400 of FIG. 4, the verification unit 403 is provided for performing a quality evaluation of the characterization of a display in accordance with various embodiments of the present invention. More specifically, the illustrated embodiment of the calibration device 400 of FIG. 4, verification unit 403 includes a transform evaluation unit 407 for performing a forward and inverse transform evaluation of a set of color values and a comparator unit 412 for evaluating differences in a set of two or more color values for calculating a quality measure, described further in detail below. Although in FIG. 4, the transform evaluation unit 407 and the comparator unit 412 are illustratively depicted as integrated components of the verification unit 403, in alternate embodiments of the present invention, the transform evaluation unit 407 and the comparator unit 412 can comprise separate components of the calibration device 400. Even further, although the calibration device 400 of FIG. 4 illustratively comprises a separate characterization unit 401 and associated components and a separate verification unit 403 and associated components, the illustrated separate components were used to make the description of a calibration device of the various embodiments of the present invention easier to understand and in alternate embodiments of the present invention, a calibration device of the present invention can comprise a single device for performing the described novel and inventive aspects and principles of the various described embodiments of the present invention. In one embodiment of the present invention, such a device can comprise a computer-like device having at least a processor, memory and integrated circuits for working in conjunction for performing the described novel and inventive aspects and principles of the various described embodiments of the present invention.

In one embodiment of the present invention, a calibration device of the present invention determines at least one of a forward and inverse transform from a first set of device dependent input color values and measured output display values of the first set of device dependent input color values on the display (i.e., using for example the color set generator and transformation unit 402), transforms a second set of device dependent input color values using the determined at least one of a forward and inverse transform to provide an intermediate set of device dependent input color values (i.e., using for example the color set generator and transformation unit 402) and performs at least one of a forward transform quality evaluation and an inverse transform quality evaluation (i.e., using for example the transform evaluation unit 407). In an alternate embodiment of a calibration device of the present invention, the device can further generate the first set of device dependent input color values and the second set of device dependent input color values (i.e., using for example the color set generator and transformation unit 402). A calibration device of the present invention can even further measure output display values of the first set of device dependent input color values and the second set of device dependent input color values on the display device using, for example, the measurement unit 404. The comparator unit 412 can then be used to compare an intermediate set of device independent output colors with a second set of device independent output colors or compare a second intermediate set of device independent output colors with the second set of device independent output colors and calculate a difference between the two sets of color values to calculate a quality measure.

A calibration device of the present invention, such as the calibration device 400 of FIG. 4 can comprise various applications and form factors, including at least the following:

1. On a PC: a calibration device of the present invention can be implemented in software to measure, characterize and calibrate a color output device (e.g., a display, projector, printer) using measurements of output colors from a photometer in order to characterize and then verify the characterization model;
2. A calibration device of the present invention can be provided in a system embedded into a color output device. In such an embodiment, the input signal transformation unit 405 is included, which transforms the input signal using the characterization model such that the output color is calibrated.
3. A calibration device of the present invention can be provided in a portable characterization system, which is the same as (2) above but without input signal transformation unit 405, instead outputting the characterization model to be used by any other equipment for calibration of output color (for example, to an external input signal transformation unit).

Figure 5:
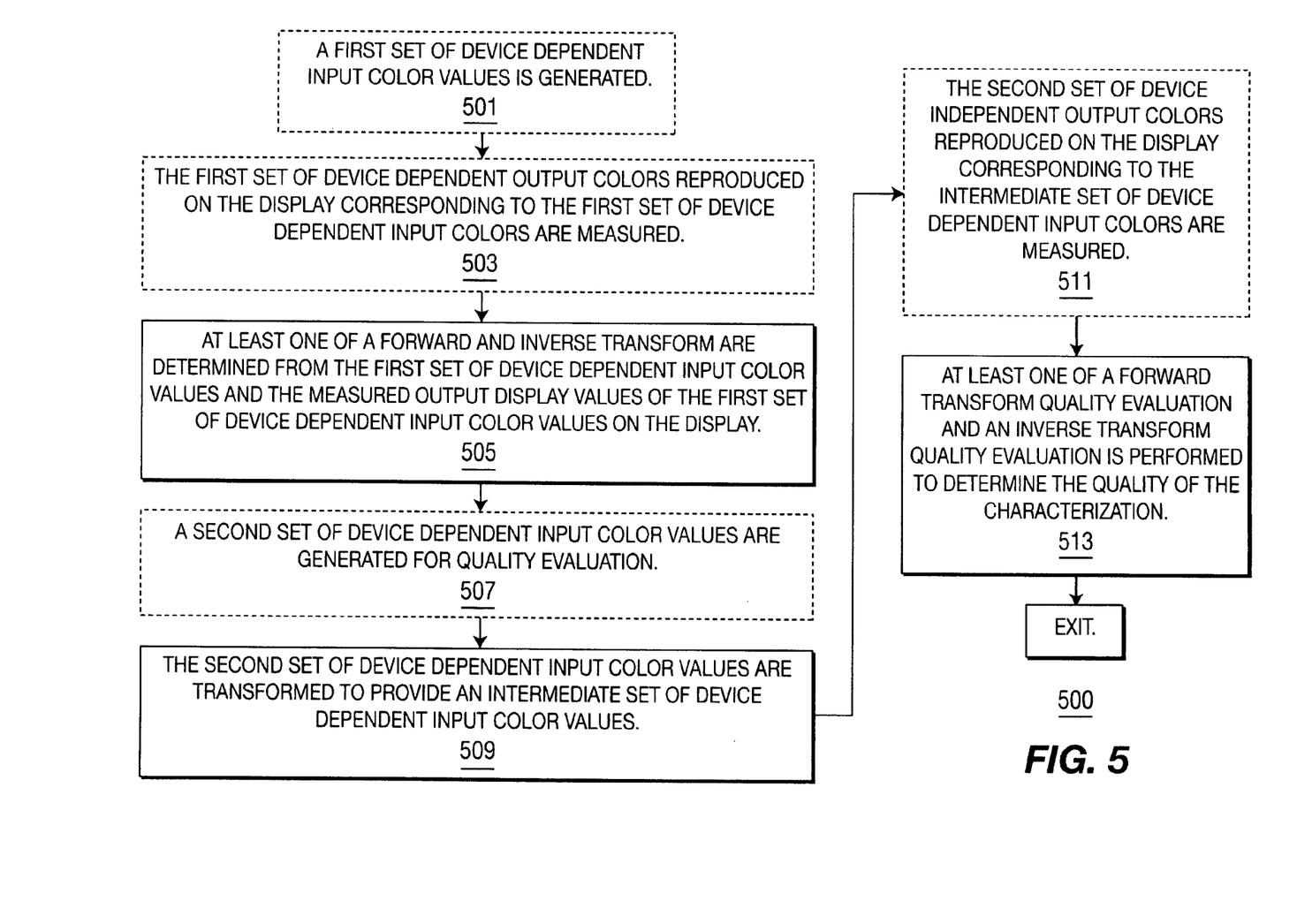
FIG. 5 depicts a flow diagram of a method for performing a display characterization in accordance with an embodiment of the present invention.

FIG. 5 depicts a flow diagram of a method 500 for performing a display characterization and assessing quality of the color characterization of the display device in accordance with an embodiment of the present invention. Such a method of the present invention can be performed on any display, whether a target or reference display, and can be performed for a single display at a time. The method 500 begins at optional step 501, in which a first set of device dependent input color values is generated for a given display device. "Device dependent" color values refer to a case in which the associated absolute, reproduced colors responsive to the device dependent color values depend on the display that is used for color reproduction. The first set of device dependent input color values can include, for example, any predefined colors, randomly generated colors, and all colors on a certain first grid in device dependent color space. As described above, generation of the first set of device dependent input color values by a calibration device of the present invention is optional because such information can be stored or communicated to a calibration device of the present invention. The method 500 then proceeds to optional step 503.

At optional step 503, the first set of absolute, device independent output colors reproduced on the display corresponding to the first set of device dependent input colors are measured. Again, as described above, measurement of the first set of device dependent input color values by a calibration device of the present invention is optional because such information can be stored or communicated to a calibration device of the present invention. The method 500 then proceeds to step 505.

At step 505, at least one of a forward and inverse transforms are determined from the first set of device dependent input color values and the measured output display values of the first set of device dependent input color values on the display. In one embodiment of the present invention, the forward and inverse transforms are generated such that the forward transform is capable of transforming the first set of device dependent input colors into the first set of absolute, device independent output colors and the inverse transform is capable of transforming the first set of absolute, device independent output colors into the first set of device dependent input colors. These transforms are capable of transforming the first set of device dependent input colors into the first set of absolute, device independent output colors or vice versa, respectively. The method 500 then proceeds to optional step 507.

At optional step 507, a second set of device dependent input color values are generated for quality evaluation. In one embodiment of the present invention, the second set of device dependent input color values can include at least one of any second predefined colors, second randomly generated colors and all colors on a certain second grid that is interlaced with the first grid in device dependent color space. That is, a second set of colors can provide measurements, where the first set of colors does not provide measurements. When building forward or inverse transforms from the first set of colors (and the responsive measurements), all colors in-between the values of the first set can be interpolated. In one embodiment of the present invention, the second set of colors are colors in-between the values of the first set of colors to verify that the interpolation works. Exemplary embodiments for creating a second set of colors include at least the following:

if the first set of colors is a grid, the second set of colors could be a grid interlaced in the first grid;
the second set of colors could be: (a) in between the first colors, and (b) at the border of color space or color gamut;
the second set of colors could be chosen such that its colors represent important colors either for an application or for a human observer. In this way, the quality evaluation is related to the application or to a human observer, respectively.

Again, as described above, generation of the second set of device dependent input color values by a calibration device of the present invention is optional because such information can be stored or communicated to a calibration device of the present invention. The method 500 then proceeds to step 509.

At step 509, the second set of device dependent input color values are transformed using said determined at least one of a forward and inverse transform to provide an intermediate set of device dependent input color values. In one embodiment of the present invention, the second set of device dependent input color values are transformed by forward transform and then by inverse transform to generate an intermediate set of device dependent input color values. The method 500 then proceeds to optional step 511.

At optional step 511, the second set of absolute, device independent output colors reproduced on the display corresponding to the intermediate set of device dependent input colors are measured. In the various embodiments of the present invention, the display can comprise any display that is to be characterized. Again, as described above, measurement of the second set of device dependent input color values by a calibration device of the present invention is optional because such information can be stored or communicated to a calibration device of the present invention. The method 500 then proceeds to step 513.

At step 513, at least one of a forward transform quality evaluation and an inverse transform quality evaluation is performed to determine the quality of the characterization of the above described method steps. The method 500 can then be exited.

Figure 6:
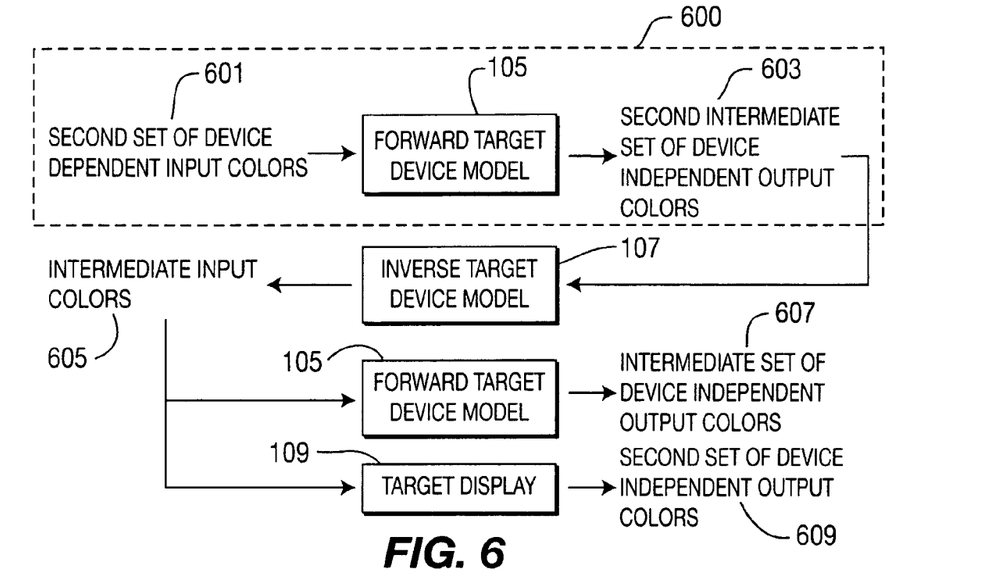
FIG. 6 depicts a schematic workflow diagram for performing a forward transform quality evaluation suitable for use in the method of FIG. 5 in accordance with an embodiment of the present invention.
Figure 7:
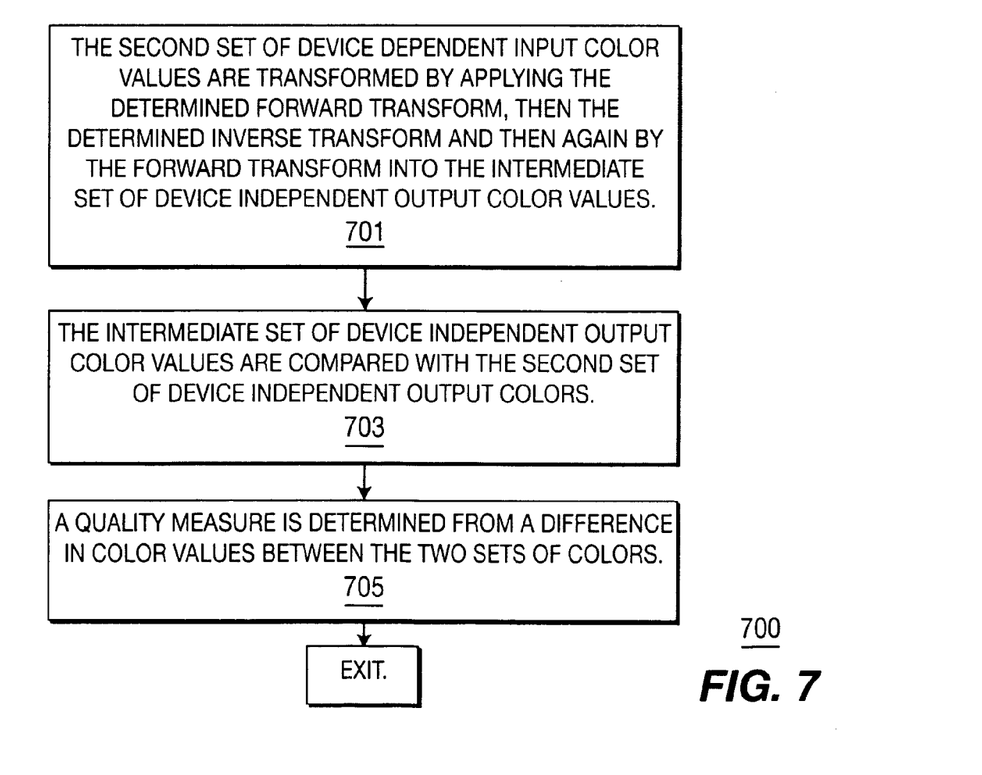
FIG. 7 depicts a flow diagram of a method for performing a forward transform quality evaluation for the workflow of FIG. 6 in accordance with an embodiment of the present invention.

FIGS. 6 and 7 illustrate and describe the performance of a forward transform quality evaluation process suitable for use in the method 500 of FIG. 5 in accordance with an embodiment of the present principles. That is, FIG. 6 depicts a schematic workflow diagram for performing a forward transform quality evaluation suitable for use in the method 500 of FIG. 5 in accordance with an embodiment of the present invention, while FIG. 7 depicts a flow diagram of a method 700 for performing a forward transform quality evaluation for the workflow of FIG. 6 in accordance with an embodiment of the present invention. More specifically, the verification process of the various embodiments of the present invention gives an error or quality evaluation. Such evaluation can be used to cause the repeat of the characterization process of, for example FIG. 5, in the event the quality is not sufficient. When repeating the characterization, more or different measurements or color values can be used, and/or a different mathematical model can be used to build the characterization model from the measurements.

Referring to both FIGS. 6 and 7, the method 700 of FIG. 7 begins at step 701, at which the second set of device dependent input color values are transformed using the determined forward and inverse transform into an intermediate set of device independent output color values. In one embodiment of the present invention, the second set of device dependent input color values are transformed by applying the determined forward transform into a second intermediate set of device independent output colors 603, which is then transformed by the determined inverse transform 107 into an intermediate set of input colors 605 and then again by the forward transform 105 into an intermediate set of absolute, device independent output color values 607.

It should be noted that the process indicated in section 600 of FIG. 6 can be performed before a verification process is initiated. That is, section 600 can be performed once, and the resultant second intermediate set of device independent input colors 603 can be thereafter used for the desired quality evaluation (e.g., a forward transform and/or inverse transform quality evaluation). The method 700 of FIG. 7 then proceeds to step 703.

At step 703, the intermediate set of absolute, device independent output color values 607 are compared with the second set of absolute, device independent output colors 609. The method 700 of FIG. 7 then proceeds to step 705.

At step 705, a quality measure is determined from a difference in color values between the two sets of colors 607 and 609. For example, the value of the two sets of colors 607 and 609 should be similar if the forward target device model 105 is a good quality model. That is, in one embodiment of the present invention the smaller the difference in values between the intermediate set of output colors and the second set of output colors, the higher the quality of the forward transform. Advantageously, a method of the present invention, as depicted in FIGS. 6-7, enables the error of the forward target device model to be evaluated independently from the errors of the inverse characterization model. The method 700 of FIG. 7 can then be exited.

Figure 8:
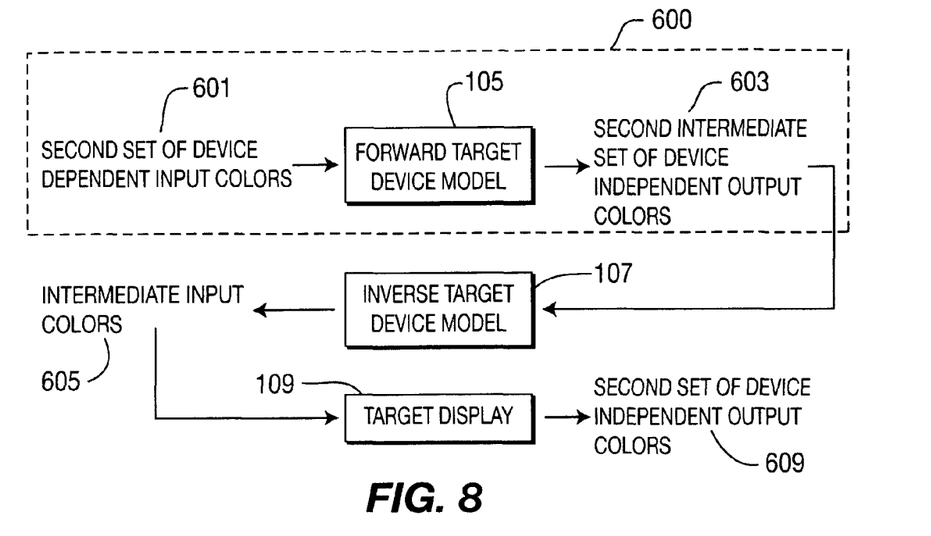
FIG. 8 depicts a schematic workflow diagram for performing an inverse transform quality evaluation suitable for use in the method of FIG. 5 in accordance with an embodiment of the present invention.
Figure 9:
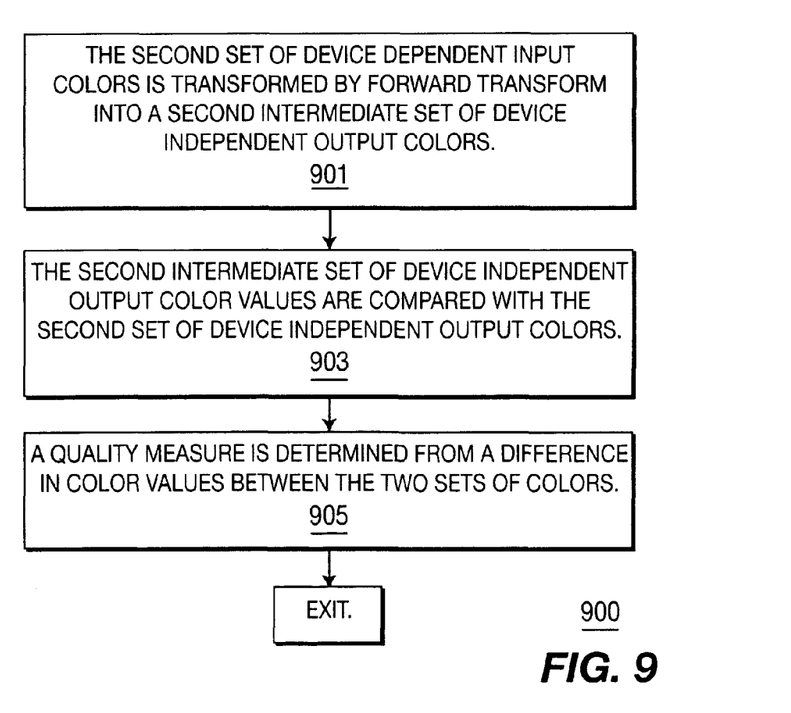
FIG. 9 depicts a flow diagram of a method for performing an inverse transform quality evaluation for the workflow of FIG. 8 in accordance with an embodiment of the present invention.

FIGS. 8 and 9 illustrate and describe the performance of an inverse transform quality evaluation process suitable for use in the method 500 of FIG. 5 in accordance with an embodiment of the present principles. That is, FIG. 8 depicts a schematic workflow diagram for performing an inverse transform quality evaluation suitable for use in the method 500 of FIG. 5 in accordance with an embodiment of the present invention, while FIG. 9 depicts a flow diagram of a method 900 for performing an inverse transform quality evaluation for the workflow of FIG. 8.

Referring to both FIGS. 8 and 9, the method 900 of FIG. 9 begins at step 901, at which the second set of device dependent input colors 601 is transformed by forward transform 105 into a second intermediate set of device independent output colors 603. The method 900 of FIG. 9 then proceeds to step 903.

At step 903, the second intermediate set of absolute, device independent output color values 603 is compared with the second set of absolute, device independent output colors 609. The method 900 of FIG. 9 then proceeds to step 905.

At step 905, a quality measure is determined from the difference between the two sets of colors 603 and 609. For example, the two sets of colors 603 and 609 should be similar if the inverse target device model 107 is a good quality model. That is, in one embodiment of the present invention, the smaller the difference in values between the second set of device independent output colors and the second intermediate set of device independent output colors, the higher the quality of the inverse transform. Advantageously, a method of the present invention, as depicted in FIGS. 8-9, enables the error of the inverse target device model to be evaluated independently from the errors of the forward characterization model. The method 900 of FIG. 9 can then be exited.

In the following section, an exemplary implementation of a system and method in accordance with an embodiment of the present invention is described for a case of reproducing colors on a display using three primary colors (RGB) as an input. It should be noted that although the following example describes a case of reproducing colors on a display using three primary colors (RGB), alternate embodiments of the present invention can be implemented in cases of displays with greater than or less than three primary colors or with color values in color spaces other than the RGB color space.

The following example is described in three parts: characterization, forward model verification and inverse model verification.

In a first embodiment, characterization is carried out according to the following steps:
A first set of device dependent input color values is generated:
For example, a set of $65^3$ RGB values $\{R_iG_iB_i/0 \le i < 65^3\}$ is generated such that $$\left\{R_iG_iB_i/R_i,\ G_i,\ B \notin \left\{\frac{255}{256}2^{j+4}/0 \le j \le 64\right\}\right\}.$$

The first set of absolute, device independent output colors $\{X_iY_iZ_i/0 \le i < 64\}$ reproduced on the display corresponding to the first set of device dependent input colors is measured;
A forward and an inverse transform from the first set of device dependent input and first set of absolute, device independent output colors is generated. These transforms are capable of transforming the first set of device independent input colors into the first set of absolute, device independent output colors or vice versa, respectively. In one embodiment of the present invention, a splines interpolation method can be used that is well adapted to the case in which a large number of measurements are available and little pre-knowledge on device characteristics are available. Thin plate splines is a physically based 3D interpolation scheme for arbitrarily spaced tabulated data. These splines are the generalization of the natural cubic splines in 1D. The spline volume represents a thin metal structure that is constrained not to move at the grid points. The idea is to build a function, f, whose graph passes through the color values and minimizes a bending energy function. In such an embodiment, the forward transform is determined using the splines interpolation while the inverse transform is determined using a tetrahedral interpolation on a regular grid in device independent color space. The regular grid is established using the splines interpolation. For example, in such an embodiment of the present invention:

a. The forward model is denoted (XYZ)=F(RGB)
b. The inverse model is denoted (RGB)=$\hat{F}$(XYZ).

A second set of device dependent input color values $\{R_i'G_i'B_i'/0\leq i<32^3\}$ is generated for quality evaluation such that the colors are in between the values of the first set of device dependent input color values.

The second set of device dependent input colors are transformed by the forward transform and then by the inverse transform into an intermediate set of device dependent input color values $\{R_i''G_i''B_i''/0\leq i<32^3\}$ such that $R_i''G_i''B_i''=\hat{F}(F(R_i'G_i'B'))$.

The second set of absolute, device independent output colors $\{X_i''Y_i''Z_i''/0\leq i<32^3\}$ reproduced on the display corresponding to the intermediate set of device dependent input colors are measured.

After characterization, forward model verification can be determined as follows:

The second set of device dependent input colors from the display device profile are measured (or previous measurements can be used);

The second set of device dependent input colors are transformed by forward transform, then by inverse transform, and then again by forward transform into an intermediate set of absolute, device independent output color values;

The second set of absolute, device independent output colors are measured (or previous measurements can be used);

The intermediate set of absolute, device independent output color values are compared with the second set of absolute, device independent output colors;

A quality measure is calculated from the difference in respective color values between the two sets of colors.

After forward model characterization and verification, an inverse model verification can be determined as follows:

The second set of device dependent input colors from the display device profile are measured (or previous measurements can be used);

The second set of device dependent input colors are transformed by forward transform into a second intermediate set of absolute, device independent output color values;

The second set of absolute, device independent output colors are measured (or previous measurements can be used);

The second intermediate set of absolute, device independent output color values are compared with the second set of absolute, device independent output colors A quality measure is calculated from the difference in respective color values between the two sets of colors.

Having described various embodiments for a method, apparatus and system for providing a color display device characterization and quality evaluation of same (which are intended to be illustrative and not limiting), it is noted that modifications and variations can be made by persons skilled in the art in light of the above teachings. It is therefore to be understood that changes can be made in the particular embodiments of the invention disclosed which are within the scope and spirit of the invention as outlined by the appended claims. While the forgoing is directed to various embodiments of the present invention, other and further embodiments of the invention can be devised without departing from the basic scope thereof.

The invention claimed is:

1. A method for assessing color characterization quality of a display device comprising the steps of:
   determining at least one of a forward and inverse transform from a first set of device dependent input color values and measured output display values of the first set of device dependent input color values on the display;
   transforming a second set of device dependent input color values using said determined at least one of a forward and inverse transform to provide an intermediate set of device dependent input color values; and
   performing at least one of a forward transform quality evaluation and an inverse transform quality evaluation using at least said second set of device dependent input color values;
   wherein said forward transform quality evaluation comprises;
      transforming said second set of device dependent input color values using said determined at least one of a forward and inverse transform to provide an intermediate set of device independent output color values; and
      comparing said intermediate set of device independent output color values with measured output display values of said intermediate set of device dependent input color values on the display to determine a quality measure; and
   wherein said inverse transform quality evaluation comprises;
      transforming said second set of device dependent input color values using said determined forward transform to provide a second intermediate set of device independent output color values; and
      comparing said second intermediate set of device independent output color values with measured output display values of said intermediate set of device dependent input color values on the display to determine a quality measure.

2. The method of claim 1, wherein said transforming comprises applying said forward transform followed by said inverse transform.

3. The method of claim 1, further comprising:
   measuring output display values of the first set of device dependent input color values on the display device; and
   measuring output display values of said intermediate set of device dependent input color values on the display device.

4. The method of claim 1, further comprising:
   generating said first set of device dependent input color values; and
   generating said second set of device dependent input color values.

5. The method of claim 1, wherein said transforming comprises transforming said second set of device dependent input color values by applying said forward transform, followed by said inverse transform and then followed by said forward transform again.

6. The method of claim 1, wherein the first set of device dependent input color values comprises at least one of predefined colors, randomly generated colors and all colors on a first grid in device dependent color space.

7. The method of claim 1, wherein the second set of device dependent input color values comprises color values in between the first set of color values.

8. The method of claim 1, wherein the smaller a difference in value between said intermediate set of device independent output color values and said measured output display values of said intermediate set of device dependent input color values, the higher the quality of the determined forward transform.

9. The method of claim 1, wherein the smaller a difference in value between said second intermediate set of device independent output color values and said measured output display values of said intermediate set of device dependent input color values, the higher the quality of the determined inverse transform.

10. An apparatus for assessing color characterization quality of a display device comprising:
 a characterization unit configured for:
  determining at least one of a forward and inverse transform from a first set of device dependent input color values and measured output display values of the first set of device dependent input color values on the display; and
  transforming a second set of device dependent input color values using said determined at least one of a forward and inverse transform to provide an intermediate set of device dependent input color values; and
 a verification unit for performing at least one of a forward transform quality evaluation and an inverse transform quality evaluation using at least said second set of device dependent input color values;
 wherein said forward transform quality evaluation comprises;
  transforming said second set of device dependent input color values using said determined at least one of a forward and inverse transform to provide an intermediate set of device independent output color values and
  comparing said intermediate set of device independent output color values with measured output display values of said intermediate set of device dependent input color values on the display to determine a quality measure; and
 wherein said inverse transform quality evaluation comprises:
  transforming said second set of device dependent input color values using said determined forward transform to provide a second intermediate set of device independent output color values; and
  comparing said second intermediate set of device independent output color values with measured output display values of said intermediate set of device dependent input color values on the display to determine a quality measure.

11. The apparatus of claim 10, wherein said apparatus comprises a color set generator and transformation module for generating at least one of said first set of device dependent input color values and said second set of device dependent input color values.

12. The apparatus of claim 11, wherein said color set generator and transformation module comprises an integrated component of said characterization unit.

13. The apparatus of claim 10, wherein said apparatus comprises a measurement unit for measuring at least one of output display values of the first set of device dependent input color values displayed on the display device and output display values of the intermediate set of device dependent input color values displayed on the display device.

14. The apparatus of claim 13, wherein said measurement unit comprises a color meter.

15. The apparatus of claim 10, wherein in performing a forward transform quality evaluation said verification unit is configured to perform the steps of:
 transforming said second set of device dependent input color values by applying said forward transform, followed by said inverse transform and then followed by said forward transform again to provide an intermediate set of device independent output color values; and
 comparing said intermediate set of device independent output color values with measured output display values of said intermediate set of device dependent input color values on the display to determine a quality measure.

16. The apparatus of claim 15, wherein said transforming is performed by a transform evaluation unit.

17. The apparatus of claim 15, wherein said comparing is performed by a comparator unit.

* * * * *